US012724890B2

(12) United States Patent
Fujii et al.

(10) Patent No.: US 12,724,890 B2
(45) Date of Patent: Sep. 1, 2026

(54) MALWARE ANALYSIS APPARATUS, MALWARE ANALYSIS METHOD, AND MALWARE ANALYSIS SYSTEM

(71) Applicant: HITACHI, LTD., Tokyo (JP)

(72) Inventors: Shota Fujii, Tokyo (JP); Rei Yamagishi, Tokyo (JP); Katsuya Nishijima, Tokyo (JP); Tomohiro Shigemoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 145 days.

(21) Appl. No.: 18/765,179

(22) Filed: Jul. 5, 2024

(65) Prior Publication Data

US 2025/0061197 A1 Feb. 20, 2025

(30) Foreign Application Priority Data

Aug. 14, 2023 (JP) ................................ 2023-132117

(51) Int. Cl.
*G06F 21/56* (2013.01)

(52) U.S. Cl.
CPC ................................ *G06F 21/563* (2013.01)

(58) Field of Classification Search
CPC ............................ G06F 21/563; G06F 21/566
See application file for complete search history.

(56) References Cited

U.S. PATENT DOCUMENTS

2011/0239294 A1* 9/2011 Kim ...................... G06F 21/563 726/22
2013/0091571 A1* 4/2013 Lu ........................ G06F 21/566 726/23
2015/0096022 A1* 4/2015 Vincent ................ G06F 21/562 726/23
2017/0251003 A1* 8/2017 Rostami-Hesarsorkh .................. G06N 5/01

(Continued)

FOREIGN PATENT DOCUMENTS

JP 2016-045887 A 4/2016

OTHER PUBLICATIONS

Ijaz et al., "Static and Dynamic Malware Analysis Using Machine Learning", Jan. 2019, 16th International Bhurban Conference on Applied Sciences and Technology, pp. 687-691 (Year: 2019).*

(Continued)

*Primary Examiner* — Kenneth W Chang
(74) *Attorney, Agent, or Firm* — Baker Botts L.L.P.

(57) ABSTRACT

The present invention provides a malware analysis apparatus, a malware analysis method, and a malware analysis system that, in a case where dynamic analysis and static analysis are combined to analyze malware, make it possible to analyze malware more easily compared with a case where the analysis is performed without using the configuration adopted by the present invention.

The malware analysis apparatus includes an analysis section, a conversion section, and a generation section. The analysis section performs dynamic analysis and static analy- (Continued)

sis of analysis target malware. The conversion section converts results of the dynamic analysis and the static analysis into natural language, and generates explanations of the analysis results. The generation section generates information regarding a behavior of analysis target malware, the information being obtained by comparing the explanations generated respectively from the dynamic analysis and the static analysis.

11 Claims, 12 Drawing Sheets

(56) References Cited

U.S. PATENT DOCUMENTS

| | | | | |
|---|---|---|---|---|
| 2018/0288076 | A1* | 10/2018 | Onodera | H04L 63/145 |
| 2020/0026851 | A1* | 1/2020 | Dhankha | G06F 21/53 |
| 2022/0366048 | A1* | 11/2022 | Dasgupta | G06F 21/563 |

OTHER PUBLICATIONS

Nakajima, et al., Static Analysis Assistance Method Utilizing the Dynamic Analysis Log, Journal of Information Processing Society of Japan, vol. 59, No. 2, pp. 800-811, 2018 (with English abstract).

* cited by examiner

| MALWARE ID | REGISTRATION DATE AND TIME | FILE NAME | HASH VALUE |
|---|---|---|---|
| 0 | 2023-01-01 10:00:00 | example.exe | 44D88612FEA8A8F36DE82E1278ABB02F |
| 1 | … | … | … |
| … | … | … | … |

| MALWARE ID (301) | ANALYSIS DATE AND TIME (302) | DYNAMIC ANALYSIS RESULT PATH (303) | DYNAMIC ANALYSIS EXPLANATION (304) | STATIC ANALYSIS RESULT PATH (305) | STATIC ANALYSIS EXPLANATION (306) |
|---|---|---|---|---|---|
| 0 | 2023-01-01 10:00:00 | /dynamic_analysis/0 /result.json | THIS MALWARE FIRST CONNECTS TO example[.]com, AND THEN TERMINATES PROCESSING. | /static_analysis/0 /result.txt | THIS MALWARE FIRST CONNECTS TO example[.]com, GENERATES A FILE NAMED "hoge.dat," EXECUTES IT THROUGH WMIC, AND THEN TERMINATES PROCESSING. |
| 1 | … | … | … | … | … |
| … | … | … | … | … | … |

| MALWARE ID (401) | ANALYSIS DATE AND TIME (402) | SUPPORT RESULT (403) |
|---|---|---|
| 0 | 2023-01-01 12:00:00 | - THE FOLLOWING IS ONLY IN STATIC ANALYSIS AND MAY BE A MALICIOUS BEHAVIOR THAT HAS NOT BEEN MANIFESTED. A FILE NAMED "hoge.dat" WILL BE SUBSEQUENTLY GENERATED AND EXECUTED THROUGH WMIC. - A SIGNIFICANT DIFFERENCE EXISTS BETWEEN STATIC ANALYSIS AND DYNAMIC ANALYSIS, SO THAT OPERATIONS MAY NOT BE MANIFESTED DUE, FOR INSTANCE, TO AN ANALYSIS AVOIDANCE FUNCTION. |
| 1 | ... | ... |
| ... | ... | ... |

FIG. 5

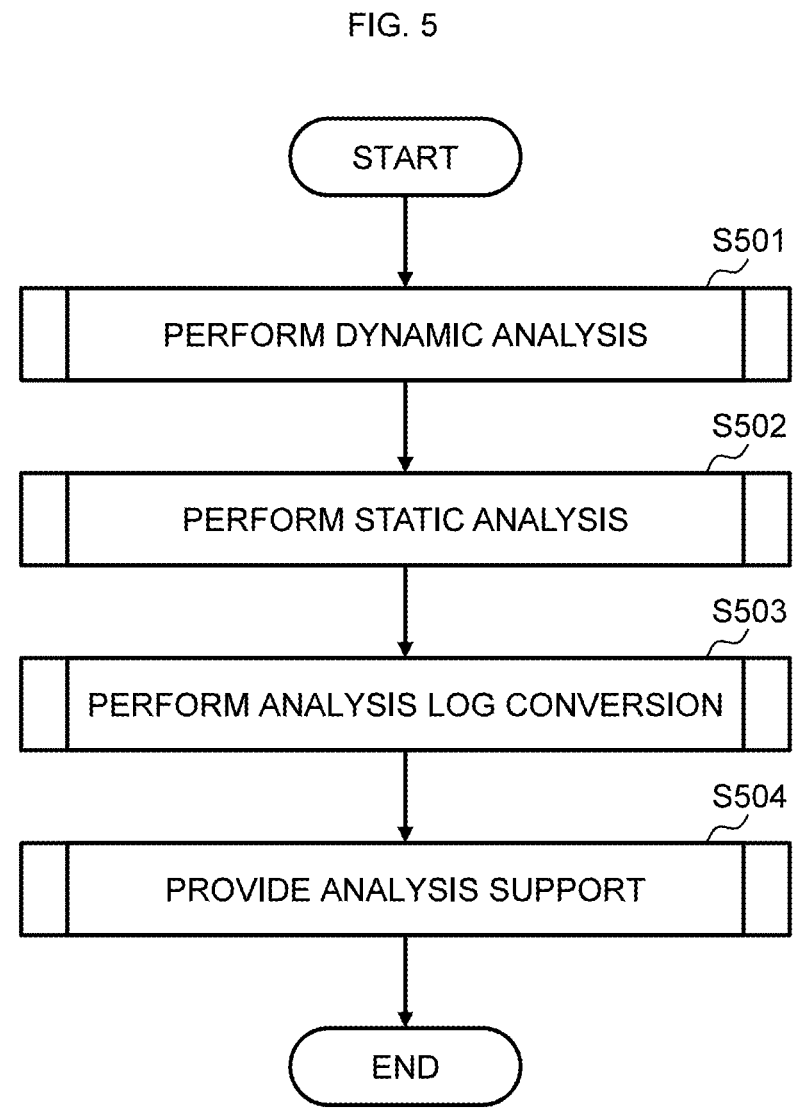

START

S501

PERFORM DYNAMIC ANALYSIS

S502

PERFORM STATIC ANALYSIS

S503

PERFORM ANALYSIS LOG CONVERSION

S504

PROVIDE ANALYSIS SUPPORT

END

FIG. 7

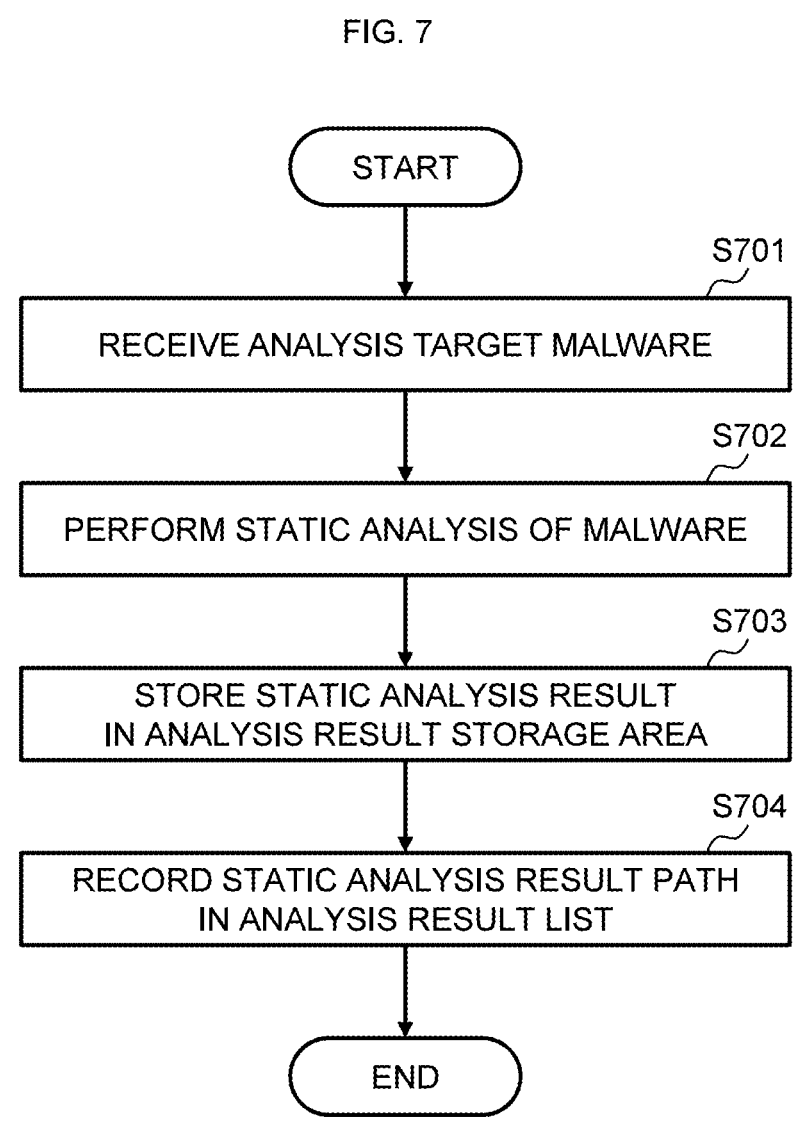

START

S701 RECEIVE ANALYSIS TARGET MALWARE

S702 PERFORM STATIC ANALYSIS OF MALWARE

S703 STORE STATIC ANALYSIS RESULT IN ANALYSIS RESULT STORAGE AREA

S704 RECORD STATIC ANALYSIS RESULT PATH IN ANALYSIS RESULT LIST

END

MALWARE OVERVIEW 1101

| MALWARE ID | REGISTRATION DATE AND TIME | FILE NAME | HASH VALUE |
|---|---|---|---|
| 0 | 2023-01-01 10:00:00 | example.exe | 44D88612FEA8A8F36DE82E1278ABB02F |

| MALWARE ID | ANALYSIS DATE AND TIME | DYNAMIC ANALYSIS RESULT PATH | DYNAMIC ANALYSIS EXPLANATION | STATIC ANALYSIS RESULT PATH | STATIC ANALYSIS EXPLANATION |
|---|---|---|---|---|---|
| 0 | 2023-01-01 10:00:00 | /dynamic_analysis/0/result.json | THIS MALWARE FIRST CONNECTS TO example[.]com, AND THEN TERMINATES PROCESSING. | /static_analysis/0/result.txt | THIS MALWARE FIRST CONNECTS TO example[.]com, GENERATES A FILE NAMED "hoge.dat," EXECUTES IT THROUGH WMIC, AND THEN TERMINATES PROCESSING. |

MALWARE ANALYSIS SUPPORT RESULT 1102

THIS MALWARE FIRST CONNECTS TO example[.]com, GENERATES A FILE NAMED "hoge.dat," EXECUTES IT THROUGH WMIC, AND THEN TERMINATES PROCESSING.

THIS MALWARE FIRST CONNECTS TO example[.]com, AND THEN TERMINATES PROCESSING.

| MALWARE ID | ANALYSIS DATE AND TIME | SUPPORT RESULT |
|---|---|---|
| 0 | 2023-01-01 12:00:00 | - THE FOLLOWING IS ONLY IN STATIC ANALYSIS AND MAY BE A MALICIOUS BEHAVIOR THAT HAS NOT BEEN MANIFESTED. A FILE NAMED "hoge.dat" WILL BE SUBSEQUENTLY GENERATED AND EXECUTED THROUGH WMIC.<br>- A SIGNIFICANT DIFFERENCE EXISTS BETWEEN STATIC ANALYSIS AND DYNAMIC ANALYSIS, SO THAT OPERATIONS MAY NOT BE MANIFESTED DUE, FOR INSTANCE, TO AN ANALYSIS AVOIDANCE FUNCTION. |

MALWARE ANALYSIS APPARATUS, MALWARE ANALYSIS METHOD, AND MALWARE ANALYSIS SYSTEM

BACKGROUND OF THE INVENTION

1. Field of the Invention

The present invention relates to a malware analysis apparatus, a malware analysis method, and a malware analysis system. The present invention particularly relates, for example, to a malware analysis apparatus suitable for assisting an analyst in analyzing malware.

2. Description of the Related Art

One method of analyzing malware is dynamic analysis that is performed by actually running malware and recording its behavior. This analysis method can be exercised semi-automatically to make an efficient analysis, and is thus widely used. Another method of analyzing malware is static analysis that is performed by deciphering malware code to reveal its behavior. Although this analysis method requires time and expertise, it is generally known that a more detailed analysis can be made. Further, attempts are being made to analyze malware in more detail and at a higher level by combining dynamic analysis and static analysis.

JP-2016-45887-A describes an observation apparatus that includes a data observation section and a transmission/reception section. The data observation section collects information regarding a user's access to a web page. The transmission/reception section transmits the collected information to an analysis apparatus. The analysis apparatus includes a transmission/reception section, an analysis section, and an information request section. The transmission/reception section receives the transmitted information. The analysis section detects a specific page transition method on the basis of the received information, and determines, based on the result of detection of the specific page transition method, whether content downloaded from an accessed web page is malicious. The information request section selects, as an analysis target, only content that is determined to be potentially malicious by the analysis section.

Non-patent literature titled "Static Analysis Auxiliary Method Using Dynamic Analysis Logs" (Shota Nakajima, Hayato Otsuki, Shuhei Akeda, Eiji Takimoto, Shoichi Saito, Koichi Mohri; Journal of Information Processing Society of Japan, Vol. 59, No. 2, pp. 800-811 (2018)) describes a technology that supports static analysis by using such a method of linking API calls to disassembled code on the basis of the result of dynamic analysis, or obtaining files and code expanded in memory by malware.

SUMMARY OF THE INVENTION

Meanwhile, static analysis and dynamic analysis use different target formats, and are thus not easily coordinated. Therefore, analyzing malware by combining dynamic analysis and static analysis requires a higher degree of expertise and a longer implementation time.

The present invention provides a malware analysis apparatus, a malware analysis method, and a malware analysis system that, in a case where dynamic analysis and static analysis are combined to analyze malware, make it possible to analyze malware more easily compared with a case where the analysis is performed without using the configuration adopted by the present invention.

In order to solve the above-described problem, according to an aspect of the present invention, there is provided a malware analysis apparatus including an analysis section, a conversion section, and a generation section. The analysis section performs dynamic analysis and static analysis of analysis target malware. The conversion section converts results of the dynamic analysis and the static analysis into natural language, and generates explanations of the analysis results. The generation section generates information regarding a behavior of analysis target malware, the information being obtained by comparing the explanations generated respectively from the dynamic analysis and the static analysis. In a case where the dynamic analysis and the static analysis are combined to analyze malware, adopting the above-described configuration provides a malware analysis apparatus that makes it possible to analyze malware more easily compared with a case where the analysis is performed without using the above-described configuration.

For example, the generation section generates information for assisting an analyst in analyzing the analysis target malware, and uses the generated information as the information regarding the behavior of the analysis target malware. In this case, more specific information can be presented to the analyst who analyzes the malware.

Further, for example, the generation section generates information suggesting a target to be analyzed by the analyst with respect to the analysis target malware, and uses the generated information as the information regarding the behavior of the analysis target malware. In this case, suggestions for analysis can be given to the analyst who analyzes malware.

Furthermore, for example, the generation section generates the information regarding the behavior of the analysis target malware on the basis of a difference between the explanations generated respectively from the dynamic analysis and the static analysis. In this case, it is possible to extract the information regarding the behavior of malware that is found in either the dynamic analysis or the static analysis.

Moreover, for example, the generation section generates information that is determined based on the difference to recommend a portion of the analysis target malware that should be analyzed by the analyst, and uses the generated information as the information regarding the behavior of the analysis target malware. In this case, it becomes easy for the analyst to identify the portion to be analyzed.

Additionally, for example, the generation section uses the information regarding the behavior of the analysis target malware to recommend that a portion in which the behavior has not been manifested in the dynamic analysis due to the difference should be covered by the static analysis. In this case, the portion in which the behavior has not been manifested in the dynamic analysis due, for instance, to a conditional branch can be covered by analysis.

Further, for example, the generation section generates information indicating that the analysis target malware is a candidate for performing analysis evasion operations. In this case, even if the malware has a function of detecting and evading analysis, the analyst can understand that the malware has such a function.

Furthermore, for example, the generation section generates information that recommends processing in a vicinity of the portion to be covered by the static analysis as processing related to preparation for analysis evasion. In this case, the processing related to the preparation for analysis evasion can also be analyzed.

Moreover, for example, in a case where no information is obtained from the result of the static analysis in correlation with the result of the dynamic analysis, the generation section generates information regarding a possibility of code being obfuscated, and uses the generated information as the information regarding the behavior of the analysis target malware. In this case, even if the code is obfuscated by the malware, the analyst can capture such obfuscation.

Additionally, for example, the generation section compares the results of the static analysis and/or the results of the dynamic analysis to generate the information regarding the behavior of the analysis target malware. In this case, the malware can be analyzed from different perspectives.

Further, the generation section detects extended functionality of an analysis target by comparing the results of the static analysis of different pieces of analysis target malware. In this case, it is possible to understand that the malware has been updated.

Furthermore, for example, the generation section compares the results of the dynamic analysis made of the same analysis target malware that are obtained before and after an environmental change, extracts an environment in which a behavior is manifested, then regards the extracted environment as an attack target environment, and/or extracts an environment in which no behavior is manifested, then regards the extracted environment as an evasion target environment. In this case, it is possible to understand the environment in which the malware operates.

According to another aspect of the present invention, there is provided a malware analysis method of, by a processor, executing a program recorded in a memory, the method including: performing dynamic analysis and static analysis of analysis target malware; converting results of the dynamic analysis and the static analysis into natural language, and generating explanations of the analysis results; and generating information regarding a behavior of analysis target malware that is obtained by comparing the explanations generated respectively from the dynamic analysis and the static analysis. In a case where the dynamic analysis and the static analysis are combined to analyze malware, adopting the above-described configuration provides a malware analysis method that makes it possible to analyze malware more easily compared with a case where the analysis is performed without using the above-described configuration.

According to yet another aspect of the present invention, there is provided a malware analysis system including a malware analysis apparatus and a display apparatus. The malware analysis apparatus analyzes analysis target malware. The display apparatus presents a result of analysis of the analysis target malware to an analyst. The malware analysis apparatus includes an analysis section, a conversion section, and a generation section. The analysis section performs dynamic analysis and static analysis of the analysis target malware. The conversion section converts results of the dynamic analysis and the static analysis into natural language, and generates explanations of the analysis results. The generation section generates information regarding a behavior of the analysis target malware, the information being obtained by comparing the explanations generated respectively from the dynamic analysis and the static analysis. In a case where the dynamic analysis and the static analysis are combined to analyze malware, adopting the above-described configuration provides a malware analysis system that makes it possible to analyze malware more easily compared with a case where the analysis is performed without using the above-described configuration.

In a case where malware is analyzed by combining dynamic analysis and static analysis, the present invention provides a malware analysis apparatus, a malware analysis method, and a malware analysis system that make it possible to analyze malware more easily compared with a case where the analysis is performed without using the above-described configuration.

BRIEF DESCRIPTION OF THE DRAWINGS

FIG. 2 is a diagram illustrating an example of a malware list;

FIG. 3 is a diagram illustrating an example of an analysis result list;

FIG. 4 is a diagram illustrating an example of an analysis support result list;

FIG. 5 is a flowchart illustrating an overview of processing that is performed by a malware analysis support system in the first embodiment;

FIG. 7 is a flowchart illustrating an example of a static analysis process that is performed on malware by the malware analysis support system in step S502 of FIG. 5;

FIG. 8 is a flowchart illustrating an example of an analysis log conversion process that is performed by the malware analysis support system in step S503 of FIG. 5;

FIG. 11 illustrates an example of a malware analysis support system drawing screen that is generated by a screen drawing program.

DETAILED DESCRIPTION OF THE PREFERRED EMBODIMENTS

Embodiments of the present invention will now be described with reference to the accompanying drawings. It should be noted, however, the present invention is not to be interpreted as being limited to the following description of the embodiments. It will be easily understood by those skilled in the art that the specific configuration of the present invention can be changed without departing from the idea or spirit of the present invention.

As regards the configuration of the invention described below, identical or similar constituent elements and functions are given the same reference signs, and will not be redundantly described.

In this document, for example, the designations “first,” “second,” and “third” are used to identify constituent elements, and do not necessarily limit the number or order of the constituent elements.

In order to facilitate the understanding of the invention, for example, the position, size, shape, and extent of each constituent element depicted, for instance, in the accompanying drawings may not always represent the actual position, size, shape, or extent. Therefore, the present invention is not limited, for example, to the position, size, shape, and extent that are disclosed, for instance, in the accompanying drawings.

First Embodiment

The following description of a first embodiment of the present invention relates to the processing that is performed by a malware analysis support system to convert both static analysis data and dynamic analysis data into explanations in natural language, and compare and coordinate the resulting explanations for the purpose of supporting malware analysis. This processing reduces the operating costs and dependency on individual skills for malware analysis.

<Overall Description of Malware Analysis System 1>

Figure 1:
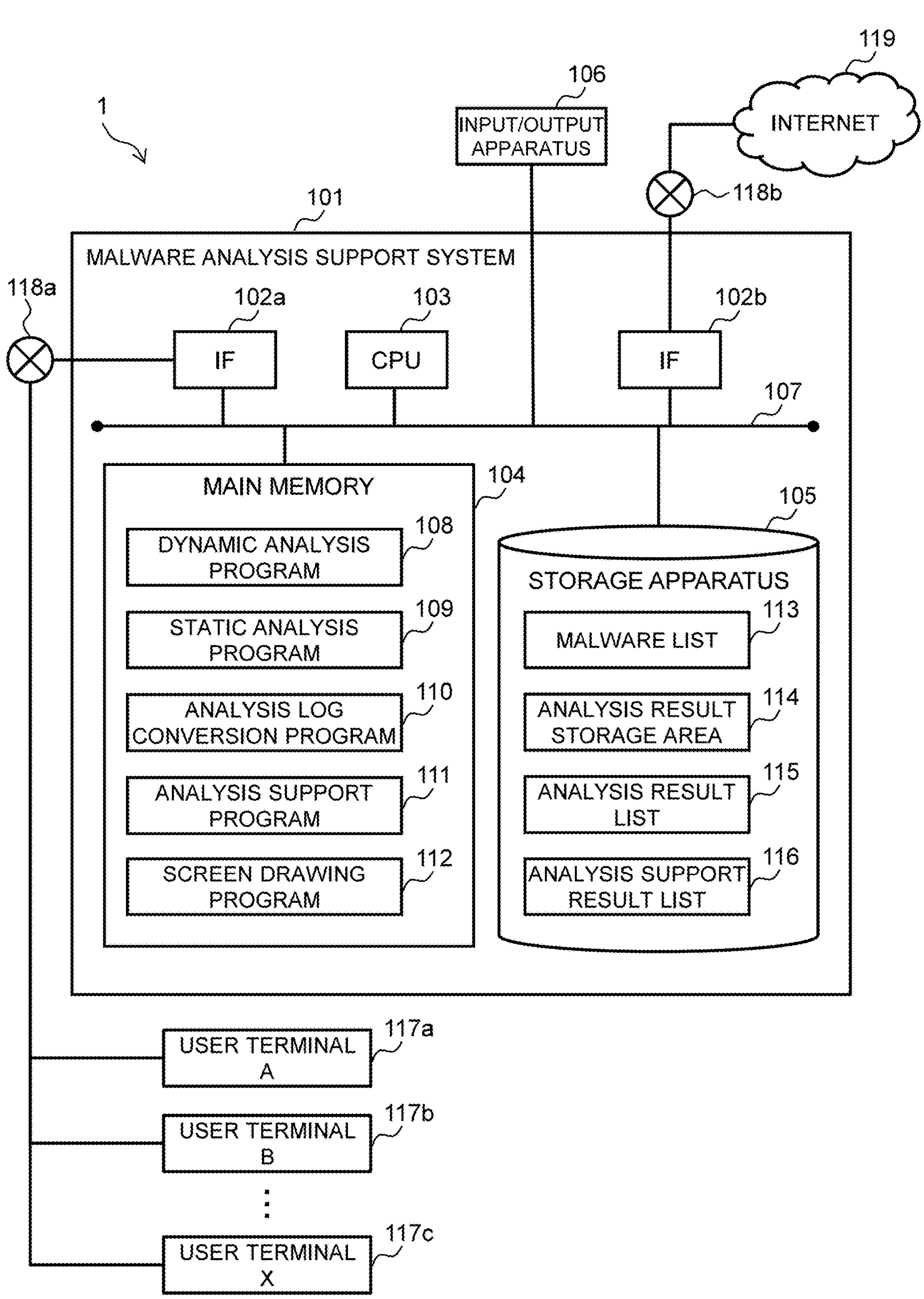
FIG. 1 is a diagram illustrating an example of the configuration of a malware analysis system according to a first embodiment.

FIG. 1 is a diagram illustrating an example of the configuration of a malware analysis system 1 according to the first embodiment.

The malware analysis system 1 according to the present embodiment is configured such that a malware analysis support system 101, user terminals (user terminals A to X) 117*a* to 117*c*, and the Internet 119 are connected through networks 118*a* and 118*b*. The malware analysis support system 101 supports the analysis of malware. The user terminals 117*a* to 117*c* are operated by users. Further, the malware analysis support system 101 is connected to an input/output apparatus 106 that is used by an analyst.

The malware analysis support system 101 is an example of a malware analysis apparatus that analyzes analysis target malware. The malware analysis support system 101 is a computer apparatus such as a server computer, a personal computer (PC), a smartphone, or a tablet computer. The malware analysis support system 101 includes a central processing unit (CPU) 103, a main memory 104, a storage apparatus 105, interfaces (IFs) 102 and 102*b*, and a communication channel 107. The CPU 103 is an example of a processor. The main memory 104 stores data that is necessary for the CPU 103 to perform processing. The storage apparatus 105 is a storage having a capacity for storing a large amount of data, such as a hard disk or a flash memory. The IFs 102 and 102*b* are used to communicate with other apparatuses. The communication channel 107 is an information transmission medium, such as a bus or a cable.

The CPU 103 analyzes the analysis target malware by executing a predetermined program stored in the main memory 104. In the present embodiment, the main memory 104 stores a dynamic analysis program 108, a static analysis program 109, an analysis log conversion program 110, an analysis support program 111, and a screen drawing program 112.

The CPU 103 executes the dynamic analysis program 108 to perform dynamic analysis of the analysis target malware. Further, the CPU 103 executes the static analysis program 109 to perform static analysis of the analysis target malware. Furthermore, the CPU 103 executes the analysis log conversion program 110 to convert each analysis result into an explanation in natural language and create a malware analysis log. Moreover, the CPU 103 executes the analysis support program 111 to analyze the created malware analysis log, generate information for assisting the analyst in analyzing the analysis target malware, and use the generated information as information regarding the behavior of the analysis target malware. In this instance, the CPU 103 generates, for example, information suggesting a target to be analyzed by the analyst with respect to the analysis target malware, and uses the generated information as the information regarding the behavior of the analysis target malware. Subsequently, the CPU 103 executes the screen drawing program 112 to output display information to the input/output apparatus 106 for the purpose of presenting each analysis result to the analyst.

The storage apparatus 105 stores data used for executing the above programs and data obtained as a result of such execution. The storage apparatus 105 stores the data of a malware list 113, the data of an analysis result storage area 114, the data of an analysis result list 115, and the data of an analysis support result list 116. The malware list 113 manages information regarding malware. The analysis result storage area 114 stores the results of dynamic analysis and static analysis of malware. The analysis result list 115 manages the result of each malware analysis. The analysis support result list 116 manages the result of malware analysis support.

The above programs and data may be pre-stored in the main memory 104 or the storage apparatus 105, or may be obtained as needed from the input/output apparatus 106 or installed (loaded) from another apparatus through the IFs 102*a* and 102*b*.

The user terminals 117*a* to 117*c* are terminal apparatuses that are operated by analysts who analyze malware. The user terminals 117*a* to 117*c* are also computer apparatuses such as PCs, smartphones, and tablet computers, and have the same configuration as the malware analysis support system 101. That is, the user terminals 117*a* to 117*c* are each includes, for example, a CPU, a main memory, a storage apparatus, IFs, and a communication channel.

The networks 118*a* and 118*b* are examples of communication networks used for information communication. For example, a local area network (LAN), a Bluetooth (registered trademark) network, or an infrared communication network may be used as the networks 118*a* and 118*b*. It should be noted that the networks 118*a* and 118*b* and the Internet 119 are not strictly distinguished from each other, and that either one of them may be used. Further, regardless of whether communication is wired or wireless, such networks may be used in combination. Furthermore, a relay apparatus, such as a gateway apparatus or a router, may be used to make connections through a plurality of networks or communication lines.

The input/output apparatus 106 includes an input device for allowing the user to input, for example, text, and an output device for displaying images and other information. The input device may be, for example, a keyboard, a mouse, or a touch panel. The output device may be, for example, a liquid crystal display or an organic electro-luminescent (EL) display. When used as the output device, the input/output apparatus 106 functions as a display apparatus that presents the result of analysis of the analysis target malware to the analyst. It should be noted that the input/output apparatus 106 may be a touchscreen having the functions of both the input device and the output device.

Further, the configurations of the malware analysis system 1 and malware analysis support system 101, which are described with reference to FIG. 1, are merely illustrative and not restrictive.

FIG. 2 is a diagram illustrating an example of the malware list 113.

As illustrated in FIG. 2, the malware list 113 is configured to include, for example, a malware ID 201, a registration date and time 202, a file name 203, and a hash value 204.

The malware ID 201 is a field that stores identification information for uniquely identifying the analysis target malware. The malware ID 201 in the first embodiment stores numbers, such as "0" and "1," as the identification information.

The registration date and time 202 is a field that indicates the date and time when the malware has been registered in the system. This field indicates that the malware corresponding, for example, to an entry with a malware ID 201 of "0" has been registered at 10:00:00 on Jan. 1, 2023. In the present embodiment, the data format for the time stored as the registration date and time 202 is not particularly limited. The registration date and time 202 may be in any data format, such as Unix time, as long as the data format allows identification of the time.

The file name 203 is a field that stores the file name of the analysis target malware. This field indicates that the file name of the malware corresponding, for example, to an entry with a malware ID 201 of "0" is "example.exe."

The hash value 204 is a field that stores the hash value of the analysis target malware. This field indicates that the hash value of the malware corresponding, for example, to an entry with a malware ID 201 of "0" is "44D88612FEA8A8F36DE82E1278ABB02F."

It should be noted that the malware list 113 described with reference to FIG. 2 is merely illustrative and not restrictive.

FIG. 3 is a diagram illustrating an example of the analysis result list 115.

As illustrated in FIG. 3, the analysis result list 115 is configured with, for example, a malware ID 301, an analysis date and time 302, a dynamic analysis result path 303, a dynamic analysis explanation 304, a static analysis result path 305, and a static analysis explanation 306.

The malware ID 301 is a field that stores identification information for uniquely identifying the analysis target malware. The malware ID 301 in the first embodiment stores numbers, such as "0" and "1," as the identification information.

The analysis date and time 302 is a field that indicates the date and time when the malware has been analyzed by the system. This field indicates that the malware corresponding, for example, to an entry with a malware ID 301 of "0" has been analyzed at 10:00:00 on Jan. 1, 2023. In the present embodiment, the data format for the time stored as the analysis date and time 302 is not particularly limited. The analysis date and time 302 may be in any data format, such as Unix time, as long as the data format allows identification of the time.

The dynamic analysis result path 303 is a field that indicates the path of the analysis result storage area 114 where the result of dynamic analysis of malware is stored. This field indicates that the result of dynamic analysis of malware with a malware ID 301 of "0" is stored in "/dynamic_analysis/0/result.json."

The dynamic analysis explanation 304 is a field for explaining the result of dynamic analysis of the malware. This field indicates that the explanation generated from the result of dynamic analysis of the malware with a malware ID 301, for example, of "0" is "This malware first connects to example[.]com, and then terminates processing."

The static analysis result path 305 is a field that indicates the path of the analysis result storage area 114 where the result of static analysis of malware is stored. This field indicates that the result of static analysis of the malware with a malware ID 301, for example, of "0" is stored in "/static_analysis/0/result.txt."

The static analysis explanation 306 is a field for explaining the result of static analysis of the malware. This field indicates that the explanation generated from the result of static analysis of the malware with a malware ID 301, for example, of "0" is "This malware first connects to example[.]com, generates a file named 'hoge.dat,' executes it through WMIC, and then terminates processing."

It should be noted that the analysis result list 115 described with reference to FIG. 3 is merely illustrative and not restrictive.

FIG. 4 is a diagram illustrating an example of the analysis support result list 116.

As illustrated in FIG. 4, the analysis support result list 116 is configured with, for example, a malware ID 401, an analysis date and time 402, and a support result 403.

The malware ID 401 is a field that stores identification information for uniquely identifying the analysis target malware. The malware ID 401 in the first embodiment stores numbers, such as "0" and "1," as the identification information.

The analysis date and time 402 is a field that indicates the date and time when the malware has been analyzed by the system. This field indicates that the malware corresponding, for example, to an entry with a malware ID 401 of "0" has been analyzed at 12:00:00 on Jan. 1, 2023. In the present embodiment, the data format for the time stored as the analysis date and time 402 is not particularly limited. The analysis date and time 402 may be in any data format, such as Unix time, as long as the data format allows identification of the time.

The support result 403 is a field for storing the descriptions of support contributing to analysis that are generated from analysis performed based on the results of dynamic analysis and static analysis of analysis target malware. This field indicates that one of the descriptions of support for malware corresponding, for example, to an entry with a malware ID 401 of "0" is "The following is only in static analysis and may be a malicious behavior that has not been manifested. A file named 'hoge.dat' will be subsequently generated and executed through WMIC." Additionally, this field indicates that the descriptions of support include "A significant difference exists between static analysis and dynamic analysis, so that operations may not be manifested due, for instance, to an analysis evasion function." These support results are generated by the analysis support program 111, which will be described later.

It should be noted that the analysis support result list 116 described with reference to FIG. 4 is merely illustrative and not restrictive.

<Description of Processing Performed by Malware Analysis Support System 101>

Processing performed by the malware analysis support system 101 will now be described.

FIG. 5 is a flowchart illustrating an overview of the processing that is performed by the malware analysis support system 101 in the first embodiment.

First, the malware analysis support system 101 performs dynamic analysis of malware (step S501). Step S501 will be described in detail with reference to FIG. 6.

Next, the malware analysis support system 101 performs static analysis of the malware (step S502). Step S502 will be described in detail with reference to FIG. 7.

Next, the malware analysis support system 101 converts the results of the dynamic analysis and static analysis into an analysis log in natural language (step S503). Step S503 will be described in detail with reference to FIG. 8.

Finally, the malware analysis support system 101 provides analysis support based on explanations that are generated from the conversion in the previous step S503 (step S504). Step S504 will be described in detail with reference to FIG. 9.

It should be noted that the processing flow of the malware analysis support system 101, which is depicted in FIG. 5, is merely illustrative and not restrictive.

Figure 6:
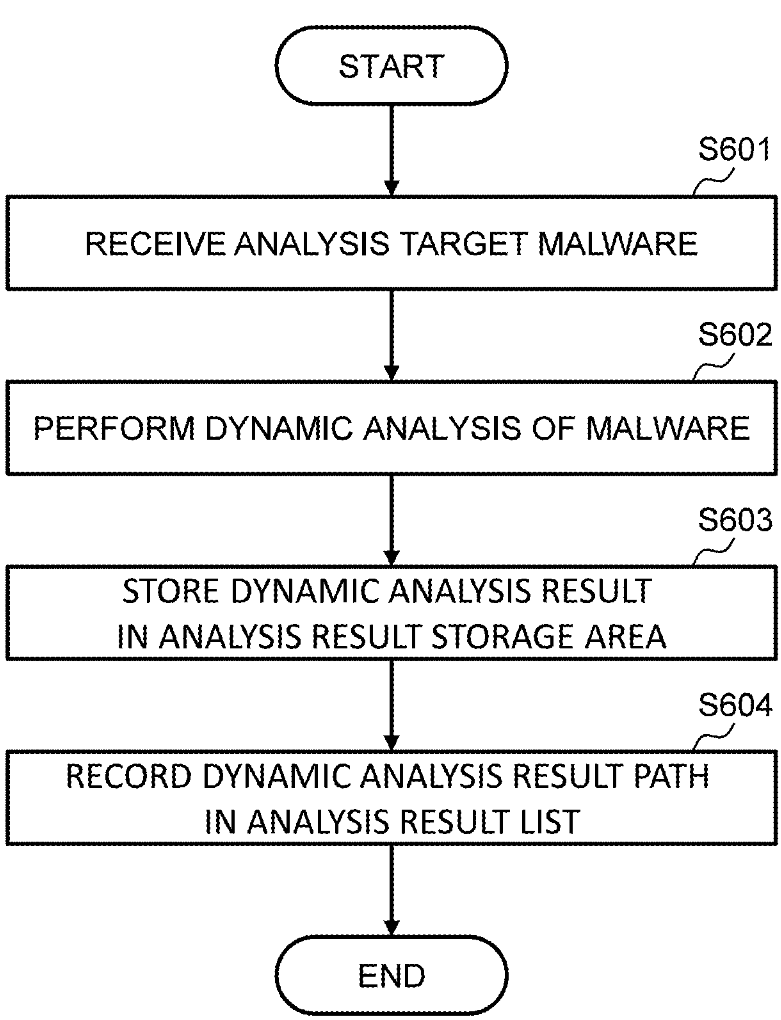
FIG. 6 is a flowchart illustrating an example of a dynamic analysis process that is performed on malware by the malware analysis support system in step S501 of FIG. 5.

FIG. 6 is a flowchart illustrating an example of a dynamic analysis process that is performed on malware by the malware analysis support system 101 in step S501 of FIG. 5.

Upon receipt of an execution instruction, the dynamic analysis program 108, which is executed by the CPU 103, starts the dynamic analysis process described below.

The dynamic analysis program 108 receives analysis target malware from the user (step S601).

Next, the dynamic analysis program 108 performs dynamic analysis of the malware received in step S601 (step S602). For example, the dynamic analysis program 108 actually runs the malware for a certain period of time to obtain information such as the connection destination and running process of the malware and files generated by the malware.

Next, the dynamic analysis program 108 stores the result of dynamic analysis of the malware, which is obtained in step S602, in the analysis result storage area 114 (step S603).

Next, the dynamic analysis program 108 records the storage path of the result of dynamic analysis of the malware, which is stored in step S603, in the dynamic analysis result path 303 of the analysis result list 115, and ends the dynamic analysis process (step S604).

It should be noted that the method of performing the dynamic analysis process, which is described with reference to FIG. 6, is merely illustrative and not restrictive. Further, the result of dynamic analysis of the malware may be recorded after it is obtained from a source other than the dynamic analysis program 108. For example, the result of such dynamic analysis may be obtained from an external malware analysis system or malware analysis service.

FIG. 7 is a flowchart illustrating an example of a static analysis process that is performed on malware by the malware analysis support system 101 in step S502 of FIG. 5.

Upon receipt of an execution instruction, the static analysis program 109, which is executed by the CPU 103, starts the static analysis process described below. The static analysis program 109 receives analysis target malware from the user (step S701).

Next, the static analysis program 109 performs static analysis of the malware received in step S701 (step S702). For example, the static analysis program 109 disassembles or decompiles the binary of the malware to obtain information regarding, for instance, an assembler and source code.

Next, the static analysis program 109 stores the result of static analysis of the malware, which is obtained in step S702, in the analysis result storage area 114 (step S703).

Next, the static analysis program 109 records the storage path of the result of static analysis of the malware, which is stored in step S703, in the static analysis result path 305 of the analysis result list 115, and ends the static analysis process (step S704).

It should be noted that the method of performing the static analysis process, which is described with reference to FIG. 7, is merely illustrative and not restrictive. Further, the result of static analysis of the malware may be recorded after it is obtained from a source other than the static analysis program 109. For example, the result of such static analysis may be obtained from an external malware analysis system or malware analysis service.

Figure 8:
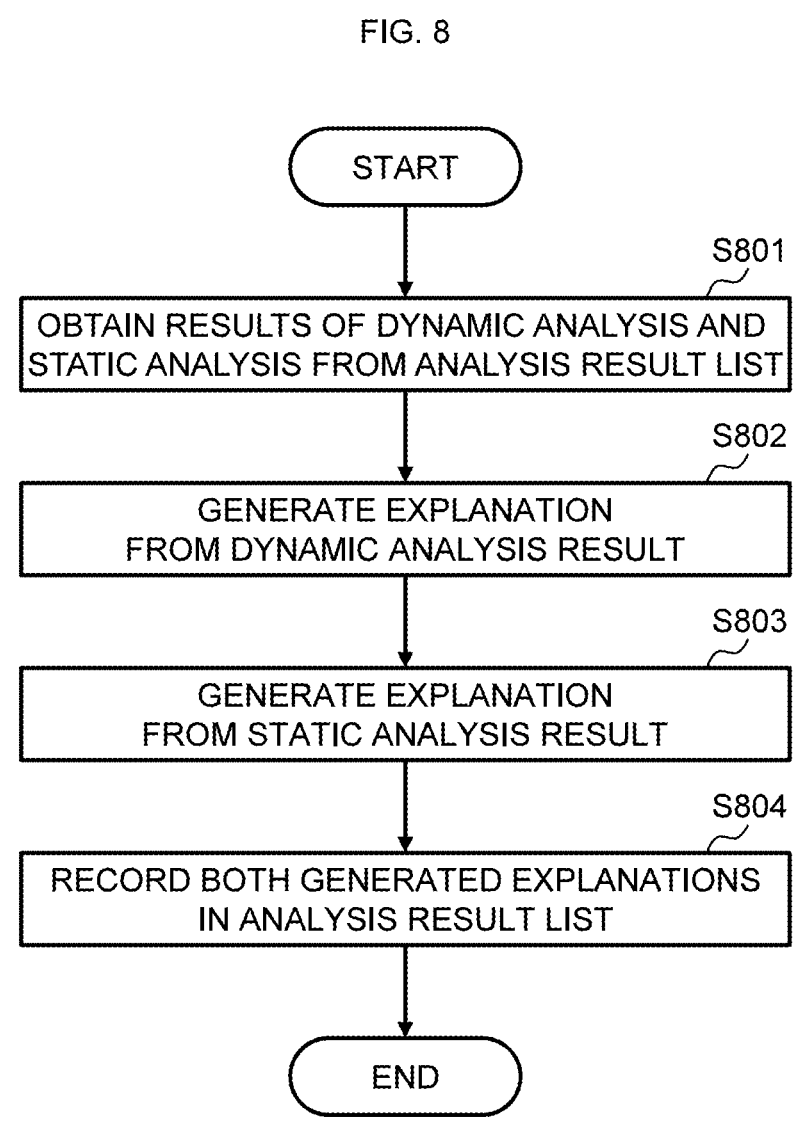

FIG. 8 is a flowchart illustrating an example of an analysis log conversion process that is performed by the malware analysis support system 101 in step S503 of FIG. 5.

Upon receipt of an execution instruction, the analysis log conversion program 110, which is executed by the CPU 103, starts the analysis log conversion process described below.

The analysis log conversion program 110 obtains the results of dynamic analysis and static analysis from the analysis result list 115 (step S801).

Next, the analysis log conversion program 110 generates an explanation from the result of dynamic analysis of the malware, which is obtained in step S801 (step S802). For example, the analysis log conversion program 110 receives a malware dynamic analysis log as the input, and generates an explanation in natural language by using, for example, a large-scale language model.

Next, the analysis log conversion program 110 generates an explanation from the result of static analysis of the malware, which is obtained in step S801 (step S803). For example, the analysis log conversion program 110 receives, as the input, an assembler obtained by disassembling the malware or source code obtained by decompiling the malware, and generates an explanation in natural language by using, for example, a large-scale language model.

Next, the analysis log conversion program 110 records the explanation based on dynamic analysis, which is generated in step S802, in the dynamic analysis explanation 304 of the analysis result list 115. Further, the analysis log conversion program 110 records the explanation based on static analysis, which is generated in step S803, in the static analysis explanation 306 of the analysis result list 115, and then ends the analysis log conversion process (step S804).

It should be noted that the method of performing the analysis log conversion process, which is described with reference to FIG. 8, is merely illustrative and not restrictive.

Figure 9:
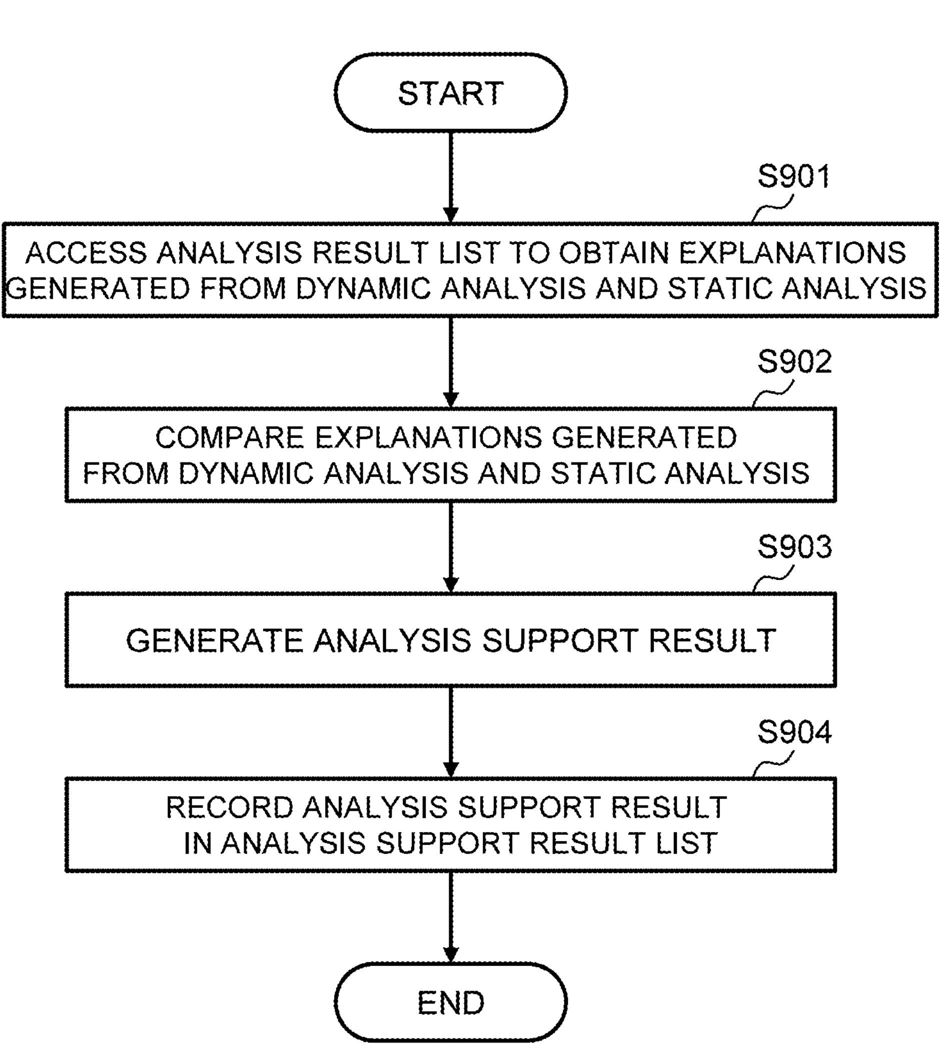
FIG. 9 is a flowchart illustrating an example of an analysis support process that is performed by the malware analysis support system in step S504 of FIG. 5.

FIG. 9 is a flowchart illustrating an example of an analysis support process that is performed by the malware analysis support system 101 in step S504 of FIG. 5.

Upon receipt of an execution instruction, the analysis support program 111, which is executed by the CPU 103, starts the analysis support process described below.

The analysis support program 111 obtains the dynamic analysis-based explanation from the dynamic analysis explanation 304 of the analysis result list 115. Further, the analysis support program 111 obtains the static analysis-based explanation from the static analysis explanation 306 of the analysis result list 115 (step S901).

Next, the analysis support program 111 compares the results generated from dynamic analysis and static analysis, which are obtained in step S901 (step S902). For example, the analysis support program 111 calculates the difference between the two compared results, and extracts behaviors included only in the dynamic analysis result and operations included only in the static analysis result.

Next, the analysis support program 111 generates the result of analysis support on the basis of the result of comparison in step S902 (step S903). It can be said that the analysis support program 111 generates information for assisting the analyst in analyzing the analysis target malware, and uses the generated information as the information regarding the behavior of the analysis target malware. It can also be said that the analysis support program 111 generates the information regarding the behavior of the analysis target malware on the basis of the difference between the explanations generated from dynamic analysis and static analysis. The analysis support program 111 generates information based on the difference to recommend a portion of the analysis target malware that should be analyzed by the analyst, and uses the generated information as the information regarding the behavior of the analysis target malware. Specifically, the analysis support program 111 recommends the portion to be statically analyzed, such as a behavior that is included only in the static analysis result and not manifested in dynamic analysis due, for instance, to a conditional branch. Further, the analysis support program 111 extracts a specimen involving such difference as a candidate for an analysis evasion specimen (a specimen that detects an analysis environment and becomes inoperative or a specimen that operates only in specific environments or situations). In this case, it can also be said that the analysis support program 111 generates information indicating that the analysis target malware is a candidate for performing an analysis evasion operation. Then, the analysis support program 111 recommends the processing relevant to such an analysis evasion specimen as the processing to be performed in preparation for analysis evasion. Additionally, the analysis support program 111 extracts the behavior included only in the dynamic analysis result as code not included in the specimen (e.g., code additionally downloaded from an attacker's server and executed), and presents the extracted code. In order to perform static analysis of such code, it is necessary to extract code, for example, from a memory dump obtained separately at the time of dynamic analysis. However, the analysis support program 111 suggests the presence or absence of such code, and suggests the range of such code if it exists. Furthermore, if no information is obtained from the static analysis result in correspondence with the dynamic analysis result, it is conceivable that the analysis support program 111 provides support, for example, by suggesting the possibility of static analysis being unsuccessful due to code obfuscation.

Next, the analysis support program 111 records the result of analysis support, which is generated in step S903, in the analysis support result list 116, and ends the analysis support process (step S904).

The method of performing the analysis support process, which is described with reference to FIG. 9, is merely illustrative and not restrictive. For example, it is conceivable that more advanced analysis is performed by combining other actors, such as analysis articles on the same specimen, with static analysis and dynamic analysis. Further, comparative analysis can be performed not only between different actors, but also within the same actor (between static analysis results or between dynamic analysis results).

That is, the analysis support program 111 generates the information regarding the behavior of the analysis target malware by comparing the analysis results obtained from static analysis or comparing the analysis results obtained from dynamic analysis. For example, in a case where any difference is revealed by the comparison between the static analysis results obtained from different specimens of the same malware family, the analysis support program 111 suggests the possibility of being updated, and presents the difference in functionality. In this case, the analysis support program 111 detects extended functionality of an analysis target by comparing the results of static analysis of different pieces of analysis target malware.

Furthermore, in a case where a significant difference is revealed by the comparison between the dynamic analysis results obtained when the same malware specimen runs in a plurality of different environments, the analysis support program 111 extracts an environment where a behavior is manifested, then regards the extracted environment as an attack target environment, and extracts an environment where no behavior is manifested, then regards the extracted environment as an evasion target environment. In this case, the analysis support program 111 compares the results of dynamic analysis of the same analysis target malware that are obtained before and after an environmental change, extracts the environment where a behavior is manifested, then regards the extracted environment as the attack target environment, and extracts the environment where no behavior is manifested, then regards the extracted environment as the evasion target environment.

Moreover, the above-described method can be applied not only to malware analysis, but also to similar security operations, such as memory forensics (the analysis of trails and operation logs left in memory), and software analysis (e.g., the analysis of binary and operation logs of programs whose specifications are lost).

<Description of Screen Drawing Process>

After the process described with reference to FIG. 5, the malware analysis support system 101 performs a screen drawing process to present various information to the user.

Figure 10:
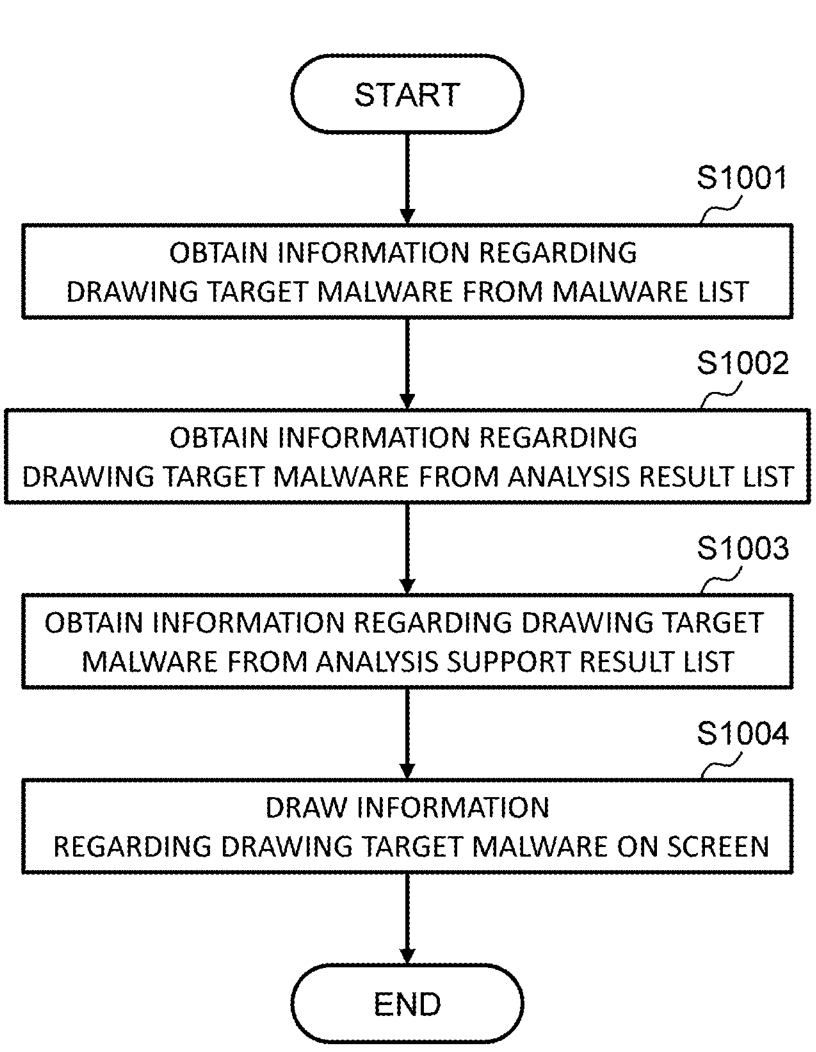
FIG. 10 is a flowchart illustrating an example of a screen drawing process that is performed by the malware analysis support system.

FIG. 10 is a flowchart illustrating an example of the screen drawing process that is performed by the malware analysis support system 101.

Upon receipt of an execution instruction, the screen drawing program 112, which is executed by the CPU 103, starts the screen drawing process described below.

The screen drawing program 112 obtains information regarding a drawing target malware from the malware list 113 (step S1001). In this instance, it is assumed that the screen drawing program 112 obtains a list containing entries including the malware ID 201.

The screen drawing program 112 obtains the information regarding the drawing target malware from the analysis result list 115 (step S1002). In this instance, it is assumed that the screen drawing program 112 obtains a list containing entries including the malware ID 301.

The screen drawing program 112 obtains the information regarding the drawing target malware from the analysis support result list 116 (step S1003). In this instance, it is assumed that the screen drawing program 112 obtains a list containing entries including the malware ID 401.

The screen drawing program 112 draws the information regarding the drawing target malware on screen (step S1004), and ends the screen drawing process.

It should be noted that the method of performing the screen drawing process, which is described with reference to FIG. 10, is merely illustrative and not restrictive.

FIG. 11 illustrates an example of a malware analysis support system drawing screen that is generated by the screen drawing program 112.

The screen depicted in FIG. 11 contains a malware overview 1101 and a malware analysis support result 1102.

The malware overview 1101 is an area for presenting basic information regarding the drawing target malware. The presented basic information includes, for example, a malware ID, a registration date and time, a file name, a hash value, a dynamic analysis explanation, and a static analysis explanation.

The malware analysis support result 1102 is an area for presenting the result of support provided for the analysis of the drawing target malware. The presented support result includes, for example, a malware ID, an analysis date and time, and a support result. Further, it is conceivable that the presented information includes the explanation of dynamic analysis and the result of static analysis in order to provide support, for example, by visually indicating the common portions of dynamic analysis and static analysis.

Since the information regarding the analysis target malware, mainly the information regarding the analysis support results, is displayed as described above, it is expected that the displayed information will assist the analyst and other users in analyzing the analysis target malware.

It should be noted that the malware analysis support system drawing screen based on the result of execution of each program according to the first embodiment has been described above. However, the above-described malware analysis support system drawing screen is merely illustrative and not restrictive. For example, any information related to malware analysis may be drawn in any format.

While malware analysis is important in security operations, it is basically performed manually, so that it entails high operating costs and is highly dependent on individual skills. Further, static analysis and dynamic analysis can be combined to perform analysis efficiently and at a high level. However, static analysis and dynamic analysis use different target formats, and are thus not easily coordinated. Therefore, malware analysis requires a higher degree of expertise and a longer implementation time.

According to the first embodiment, the malware analysis support system 101 converts both static analysis data and dynamic analysis data into explanations in natural language, then compares and coordinates the resulting two explanations for the purpose of supporting malware analysis. Consequently, no problem occurs due to the above-mentioned difference in format. Subsequently, the information for assisting the analyst in performing malware analysis and the information for suggesting a target to be analyzed by the analyst are generated based on the explanations generated from the conversion into natural language. Therefore, more specific information can be presented to the analyst, so that the analyst can obtain more useful information when analyzing malware. As a result, it is expected that the operating costs and dependency on individual skills for malware analysis will be reduced. Moreover, malware analysis can be performed more easily.

Additionally, it is expected that the support results obtained in accordance with the present embodiment will be applicable to system recovery and implementation of automated countermeasures. For example, the support results may possibly be used to automatically implement countermeasures to prevent malware infection based on the analysis evasion function extracted by the technology described in this document. Specifically, when it is determined that a specific key in the registry is detected by the function of evading analysis in a virtual environment, the value of such a key can be set, for example, so as to avoid infection.

Second Embodiment

A second embodiment of the present invention will now be described in relation to the processing that the malware analysis system performs to provide services in the cloud, by making a support function available externally through a network in addition to providing malware analysis support on-premise.

The second embodiment is described below, focusing on the differences from the first embodiment.

Figure 12:
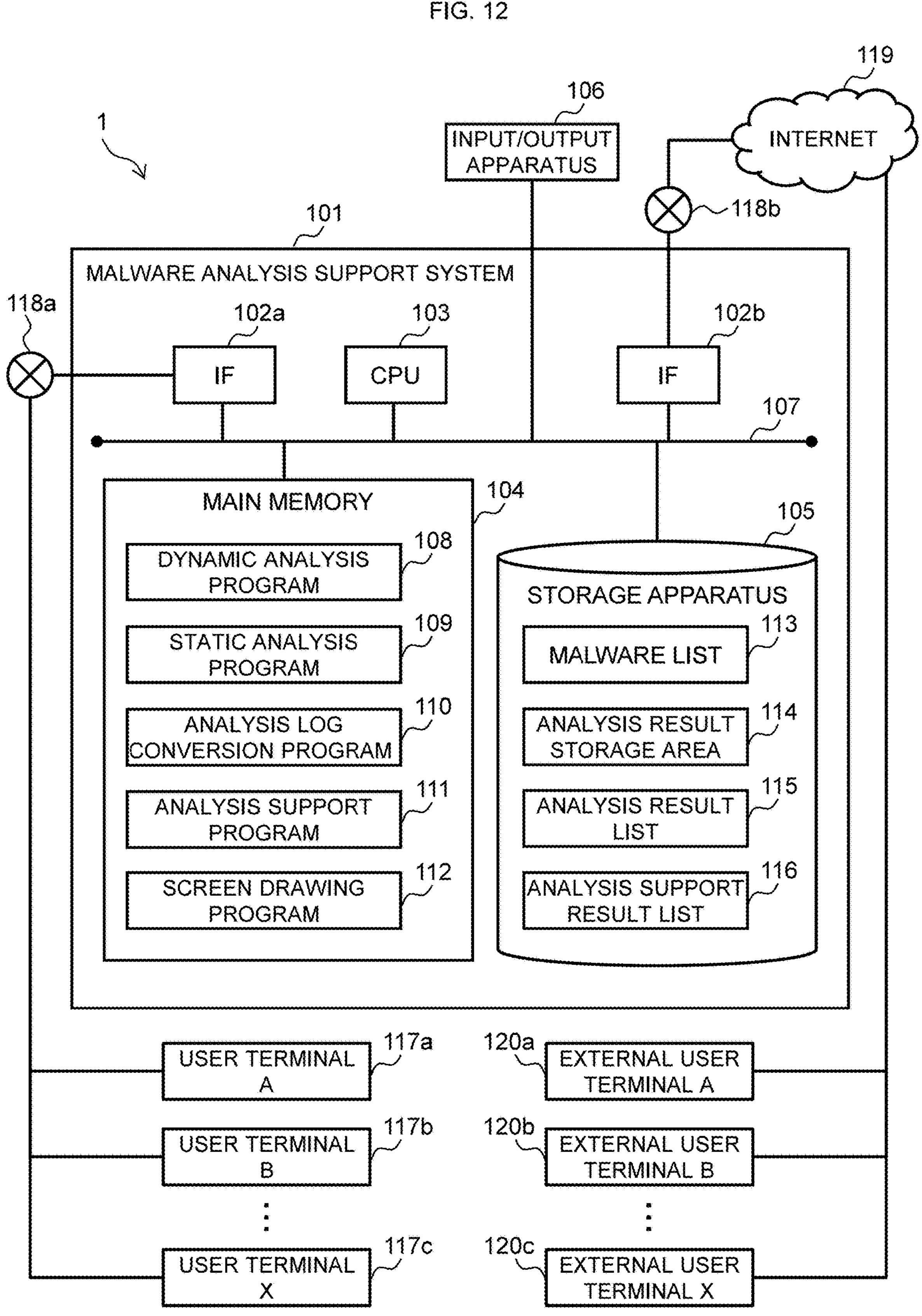
FIG. 12 is a diagram illustrating an example of the configuration of the malware analysis system according to a second embodiment.

FIG. 12 is a diagram illustrating an example of the configuration of the malware analysis system 1 according to the second embodiment.

The hardware configuration of the illustrated malware analysis system 1 is similar to that of the malware analysis system 1 illustrated in FIG. 1 except that the former includes external user terminals (external user terminals A to X) 120*a* to 120*c* in addition to the constituent elements of the malware analysis system 1 illustrated in FIG. 1. In the second embodiment, each program performs processing in response to requests from not only the user terminals 117*a* to 117*c* in the networks but also the external user terminals 120*a* to 120*c*, and returns the result of processing to the external user terminals 120*a* to 120*c* through the networks 118*a* and 118*b* and the Internet 119. This makes it possible to provide services in the cloud.

The programs of the second embodiment are the same as those of the first embodiment, and include the dynamic analysis program 108, the static analysis program 109, the analysis log conversion program 110, the analysis support program 111, and the screen drawing program 112. The processes performed by these programs are the same as those in the first embodiment.

The data structure of the second embodiment is the same as that of the first embodiment. Consequently, the storage apparatus 105 stores the malware list 113, the analysis result storage area 114, the analysis result list 115, and the analysis support result list 116.

It should be noted that the configuration of the malware analysis system according to the second embodiment, which is described with reference to FIG. 12, is merely illustrative and not restrictive.

According to the second embodiment, the malware analysis support system 101 provides a malware analysis support function to internal users on-premise as is the case with the first embodiment, and also provides similar information to external users through the networks 118*a* and 118*b* and the Internet 119. This makes it possible to provide services in the cloud.

In the first and second embodiments described above, it is assumed that the input/output apparatus 106 presents the analysis results to the analyst. However, the analysis results may be displayed on a display apparatus provided in the user terminals 117*a* to 117*c* and the external user terminals 120*a* to 120*c*.

<Description of Malware Analysis Method>

The processing performed by the malware analysis support system 101 in the foregoing embodiments, which is described above, is implemented by collaboration between software and hardware resources. Specifically, as depicted in FIG. 1, the CPU 103 and other processors included in the malware analysis support system 101 load programs into the main memory 104, and execute the loaded programs to implement the functions of the malware analysis support system 101. The programs to be loaded and executed include the dynamic analysis program 108, the static analysis program 109, the analysis log conversion program 110, the analysis support program 111, and the screen drawing program 112.

Consequently, the processing performed by the above-mentioned malware analysis support system 101 can be considered as a malware analysis method in which a processor executes the programs recorded in memory to perform dynamic analysis and static analysis of analysis target malware, converts the results of dynamic analysis and static analysis into natural language, generates explanations based on the analysis results, and generates information regarding the behavior of the analysis target malware that is obtained by comparing the explanations generated from dynamic analysis and static analysis.

In the above case, the CPU 103 functions as an analysis section that performs dynamic analysis and static analysis of the analysis target malware. The CPU 103 also functions as a conversion section that converts the results of dynamic analysis and static analysis into natural language and generates explanations regarding the analysis results. Additionally, the CPU 103 functions as a generation section that generates the information regarding the behavior of the analysis target malware, which is obtained by comparing the explanations generated respectively from the dynamic analysis and the static analysis.

The programs for implementing the foregoing embodiments can, of course, be provided by communication means, but can also be stored in a CD-ROM or other recording medium and provided.

While the present invention has been described in conjunction with the foregoing embodiments, the technical scope of the present invention is not limited to the scope described in conjunction with the foregoing embodiments. It is obvious from the scope of the appended claims that various modifications and improvements to the foregoing embodiments are also included in the technical scope of the present invention.

What is claimed is:

1. A malware analysis apparatus comprising:
an analysis section that performs dynamic analysis and static analysis of analysis target malware;
a conversion section that converts a result of the dynamic analysis and a result of the static analysis into natural language, and generates explanations of the analysis results; and
a generation section that generates information regarding a behavior of the analysis target malware, the information being obtained by comparing the explanations generated respectively from the dynamic analysis and the static analysis;
wherein the generation section recommends sections for the static analysis as a portion where behavior did not manifest during the dynamic analysis and based on differences between the explanations obtained from the dynamic analysis and the static analysis as information regarding a behavior of the analysis target malware.

2. The malware analysis apparatus according to claim 1, wherein the generation section generates and uses the information regarding the behavior of the analysis target malware to assist an analyst in analyzing the analysis target malware.

3. The malware analysis apparatus according to claim 2, wherein the generation section generates and uses the information regarding the behavior of the analysis target malware to suggest a target to be analyzed by the analyst with respect to the analysis target malware.

4. The malware analysis apparatus according to claim 1, wherein the generation section generates information indicating that the analysis target malware is a candidate for performing analysis evasion operations.

5. The malware analysis apparatus according to claim 4, wherein the generation section generates information that recommends processing in a vicinity of the portion to be covered by the static analysis as processing related to preparation for analysis evasion.

6. The malware analysis apparatus according to claim 1, wherein, when no information is obtained from the result of the static analysis in correspondence with the result of the dynamic analysis, the generation section generates information regarding a possibility of code being obfuscated, and uses the generated information as the information regarding the behavior of the analysis target malware.

7. The malware analysis apparatus according to claim 1, wherein the generation section compares the results of the static analysis and/or the results of the dynamic analysis to generate the information regarding the behavior of the analysis target malware.

8. The malware analysis apparatus according to claim 7, wherein the generation section detects extended functionality of an analysis target by comparing the results of the static analysis of different pieces of the analysis target malware.

9. The malware analysis apparatus according to claim 7, wherein the generation section compares the results of the dynamic analysis of a same analysis target malware that are obtained before and after an environmental change, extracts an environment where a behavior is manifested, then regards the extracted environment as an attack target environment, and/or extracts an environment where no behavior is manifested, then regards the extracted environment as an evasion target environment.

10. A malware analysis method of, by a processor, executing a program recorded in a memory, the method comprising:
performing dynamic analysis and static analysis of analysis target malware;
converting a result of the dynamic analysis and a result of the static analysis into natural language, and generating explanations of the analysis results; and
wherein by comparing the explanations obtained from the dynamic analysis and the static analysis, and using differences between the explanations as information regarding a behavior of the analysis target malware, the analysis target malware recommends areas for static analysis where behavior did not manifest during the dynamic analysis.

11. A malware analysis system comprising:
a malware analysis apparatus that analyzes analysis target malware; and
a display apparatus that presents a result of analysis of the analysis target malware to an analyst;
wherein the malware analysis apparatus includes:
an analysis section that performs dynamic analysis and static analysis of the analysis target malware,
a conversion section that converts a result of the dynamic analysis and a result of the static analysis into natural language, and generates explanations of the analysis results, and
a generation section that generates information regarding a behavior of the analysis target malware, the information being obtained by comparing the explanations generated respectively from the dynamic analysis and the static analysis;
wherein the generation section recommends sections for the static analysis as a portion where behavior did not manifest during the dynamic analysis and based on differences between the explanations obtained from the dynamic analysis and the static analysis as information regarding a behavior of the analysis target malware.

* * * * *